United States Patent [19]

Delafosse

[11] 4,240,876
[45] Dec. 23, 1980

[54] NUCLEAR FUEL ASSEMBLY

[75] Inventor: Jacques Delafosse, Gif-sur-Yvette, France

[73] Assignee: Commissariat a l'Energie Atomique, Paris, France

[21] Appl. No.: 904,484

[22] Filed: May 10, 1978

[30] Foreign Application Priority Data

May 13, 1977 [FR] France ................................ 77 14754

[51] Int. Cl.³ .................................................. G21C 3/30
[52] U.S. Cl. ......................................... 176/78; 176/76
[58] Field of Search ..................................... 176/78, 76

[56] References Cited

U.S. PATENT DOCUMENTS

| | | | |
|---|---|---|---|
| 3,674,637 | 7/1972 | Delafosse | 176/78 |
| 3,791,466 | 2/1974 | Patterson | 176/78 |
| 3,954,560 | 5/1976 | Delafosse | 176/78 |
| 3,997,394 | 12/1976 | Aisch | 176/76 |
| 4,119,490 | 10/1978 | Delafosse | 176/78 |

Primary Examiner—Donald P. Walsh
Attorney, Agent, or Firm—Thomas R. Boland

[57] ABSTRACT

The fuel assembly comprises a bundle of fuel pins spaced in parallel relation in a uniform lattice by means of support grids resiliently applied against the fuel pins and a rigid independent structure formed by two parallel end plates. Tie-rods extending between the end plates are disposed at uniform intervals at the lattice nodes. The bundle of fuel pins is supported by the first grid on a series of tubular spacer members which surround the lower ends of at least a number of tie-rods with provision for a clearance space. The tubular spacer members extend between the bottom end plate and the first grid, the tie-rods being permitted to pass freely through each grid by means of guide sleeves.

2 Claims, 1 Drawing Figure

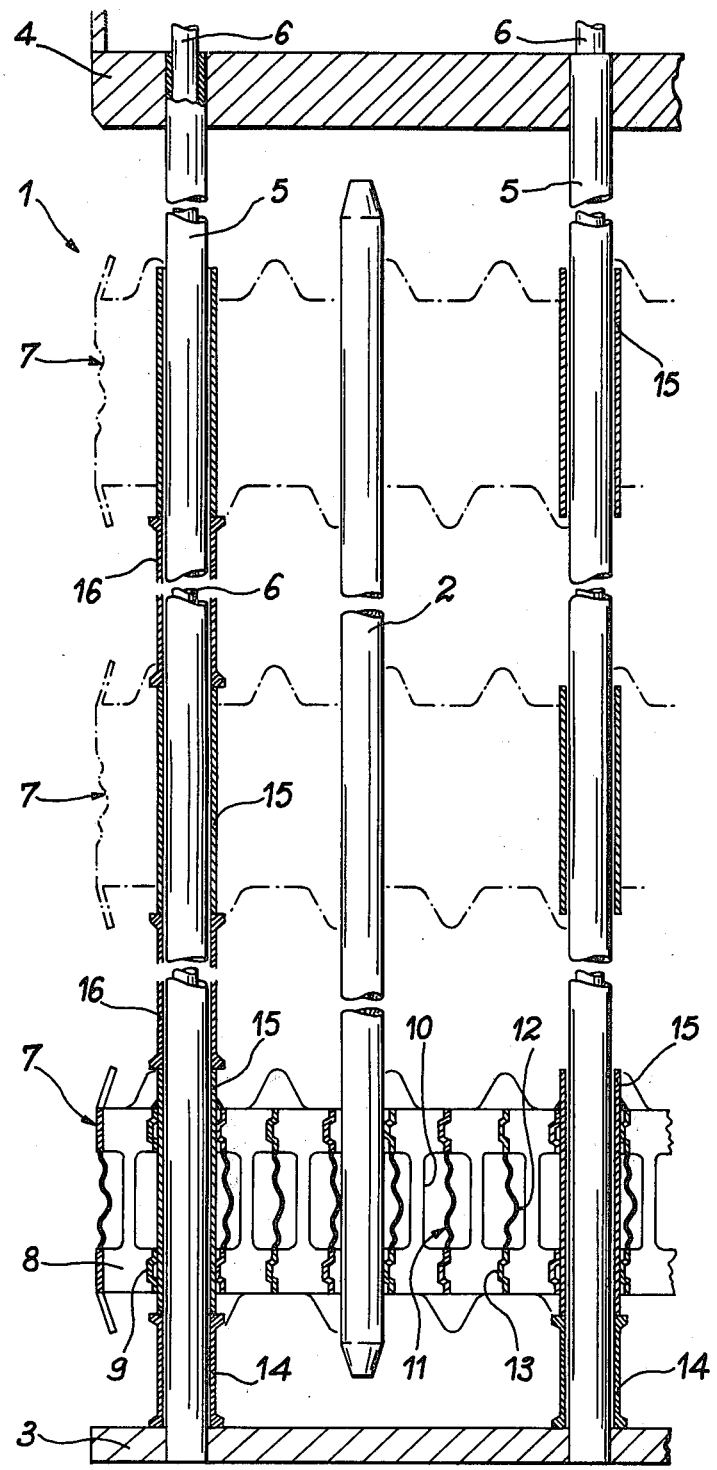

NUCLEAR FUEL ASSEMBLY

This invention relates to a nuclear fuel assembly for a light-water or heavy-water reactor or for a fast reactor, of the type comprising a bundle of clad fuel pins maintained in spaced relation in a uniform lattice by means of an array of separate support grids fitted with elements which serve to provide resilient application of the grids against the pins.

More specifically, the invention is concerned with a fuel assembly of the type described and claimed in French Pat. No. 2,088,009 (U.S. Pat. No. 3,954,560) in the name of Commissariat à l'Energie Atomique. This assembly comprises a rigid structure which is independent of the fuel pins and formed by two parallel end plates between which extend tie-rods preferably having substantially the same diameter as the fuel pins and disposed at uniform intervals at the nodes of the fuel-pin lattice. In this design, the spacer grids are not rigidly fixed to said tie-rods but are so arranged as to be capable of sliding on these latter. By reason of the fact that the number of fuel pins is greater than that of the tie-rods, the spacer grids are constrained to accompany said pins in the movements carried out by these latter as a result of differential expansions during operation and accordingly slide on said tie-rods. As an advantageous feature, stops in the form of sleeves or the like are provided on the tie-rods between the different grids in order to prevent displacements of these latter beyond predetermined limits.

In a design of this type, the pins of the bundle usually extend in a vertical direction and rest on the bottom plate of the rigid structure whilst the spacer grids slide on the tie-rods together with the fuel pins in the direction of the top plate. Under these conditions, increases in length of said fuel pins can attain not negligible values, especially in the case of designs of fuel assemblies currently in use and having longitudinal dimensions of the order of 4 m or more. Sliding of the upper grids on the tie-rods accordingly becomes excessive and is liable to present problems in regard to guiding and behavior of the fuel-pin bundle as well as in regard to wear of said tie-rods.

In order to overcome this disadvantage, another form of construction of a fuel assembly of the type mentioned above has already been proposed, especially in U.S. patent application No. 753,451 filed on Dec. 22, 1976 now U.S. Pat. No. 4,119,490 in the name of Commissariat à l'Energie Atomique in respect of "A nuclear fuel assembly". In this design, the bundle of fuel pins is associated with a central support grid placed substantially at the mid-height of the assembly and rigidly fixed to the tie-rods whilst the other support grids are placed on each side of the central grid and disposed at intervals along the assembly in the vertical direction, with the result that length increases in the fuel pins take place from said central grid respectively towards the top and bottom plates of the structure. An arrangement of this type offers a number of advantages. In the first place, the fuel pins are no longer subject to wear as a result of movement of the spacer grids since said pins are in fact secured to the grids by means of resilient bearing elements as in the case of the design adopted in the first patent cited earlier. In the second place, it is also possible to remove any potential danger of deformation or buckling of the fuel pins in which the lower ends of these latter would no longer rest on the support plate. Furthermore, this arrangement would also have the effect of limiting the displacement of the grids with respect to the tie-rods and consequently of limiting the wear and deformation of these latter. However, a drawback may remain by reason of the fact that the weight of the assembly and especially of the bundle of fuel pins is supported only on the bottom portion of the tie-rods by means of the central grid, which is liable to produce deformation of the tie-rods.

The present invention relates to an improvement in the design and construction of a nuclear fuel assembly of the type recalled in the foregoing. This improvement makes it possible to ensure better supporting and position-maintenance of the fuel pins while removing any danger of deformation both of the fuel pins of the tie-rods which serve to brace the end plates of the associated rigid structure.

To this end, the fuel assembly under consideration is characterized in that the bundle of fuel pins carried by the support grids rests on a series of tubular spacer members which surround the lower ends of at least a certain number of tie-rods with provision for a clearance space. Said tubular spacer members extend between the bottom end plate and the first support grid, guide sleeves being provided in each grid for the free passage of the tie-rods.

In accordance with a further distinctive feature, the distance between the successive support grids along the length of the fuel pins is limited to a minimum value by means of spacer tubes mounted around a limited number of tie-rods so as to form an axial clearance space which permits of free displacements of the support grids which follow the first grid.

By virtue of these arrangements, the connections between the successive grids and tie-rods are established by means of sleeves which are capable of sliding freely on said tie-rods. In consequence, wear of the tie-rods is suppressed and limitation of the amplitude of displacement of the grids which follow the fuel pins during their expansion is of smaller value than in the conventional structures recalled in the foregoing. Moreover, in the design solution offered by the present invention, the load represented by the weight of the fuel bundle as a whole can be judiciously distributed over a large number of short tubular spacer members located between the bottom plate and the first support grid, thus ensuring uniform and efficient application of said load. Finally, the spacing between intermediate grids as ensured by means of a minimum number of tubular spacer members or sleeves is in no way likely to inhibit sliding displacement of the assembly formed by the fuel pins and grids along said tie-rods. There is thus no potential danger of stress arising from friction or the like which would be liable to result in any deformation of said fuel pins or of the tie-rods themselves. It should be noted that no spacer member of this type is provided between the last grid and the top end plate in order to ensure that the load applied by the fuel pins in the structure may freely attain a point of equilibrium without stress in the tie-rods.

The overall result thereby achieved is that the fuel assembly structure in accordance with the invention has the advantage of accommodating all deformations of the fuel pins, of the support grids and of the tie-rods under irradiation without producing any stress in said tie-rods or in the bearing spacer members during operation, said tie-rods being subjected only to tensile stress at the time of loading and unloading of the fuel assembly.

Further distinctive features of a nuclear fuel assembly as constructed in accordance with the invention will become apparent from the following description of one exemplified embodiment which is given by way of indication without any limitation being implied, reference being made to the accompanying drawings in which the single FIGURE illustrates one particular embodiment.

The fuel assembly which is shown diagrammatically in this FIGURE is generally designated by the reference numeral 1. The assembly is composed of a bundle of clad fuel pins which have a vertical axis and are parallel to each other. In the example chosen, the bundle is constituted by 264 fuel pins of uranium oxide $UO_2$ clad with a zirconium alloy. The bundle of pins is mounted between two horizontal plates, namely a bottom plate 3 and a top plate 4 which are braced by means of a series of tie-rods 5 spaced at suitable intervals in the bundle of fuel pins 2 and located in particular at predetermined nodes of the lattice. Advantageously, provision is made for twenty-four tie-rods 5 each having a diameter which is close in value to that of the fuel pins. Said tie-rods are secured to the end plates by mechanical coupling means or the like in order to constitute a rigid structure. If so required, said tie-rods may also serve as guides for control or instrumentation elements such as the element 6 which are slidably mounted within the tie-rods in order to change the reactivity in the reactor core or to carry out suitable measurements or tests within the fuel assembly itself.

The geometry of the lattice of fuel pins 2 of the bundle with respect to the tie-rods 5 is maintained by means of parallel support grids 7, provision being made in the example under consideration for eight grids disposed at suitable intervals according to the length of the fuel pins. In a manner which is known per se, each support grid is made up of two sets of sheet metal plates 8 and 9 respectively which extend in two perpendicular directions in order to form between them a series of square-section compartments each traversed by one of the pins 2 of the bundle. The support grids 7 are secured to said fuel pins by means of a resilient supporting connection. To this end, central openings 10 are formed in the plates 8 and 9 of said support grids, a connection being established between the top and bottom edges of said openings by means of corrugated strips 11. The central portion of each strip is provided with a projecting flange 12 and this latter is capable of coming into contact with the fuel pin 2 which passes through the corresponding compartment. The top and bottom portions of the plates 8 and 9 are also provided with bosses 13, the fuel pins 2 being applied against said bosses by the strips 11. By means of these arrangements which have already been described and claimed in French Pat. No. 2,088,009, the support grids 7 can be suitably maintained in position with respect to the bundle of fuel pins 2 while ensuring the possibility of a sliding connection between these elements if necessary. By virtue of these connections, the support grids 7 are thus secured to the bundle of fuel pins 2 and follow these latter in all displacements caused by differential expansions but remain capable of sliding with respect to the tie-rods 5.

In accordance with the invention, the assembly formed by the bundle of fuel pins 2 is supported on the rigid structure formed by the end plates 3 and 4 and the tie-rods 5 by means of a series of tubular spacer members 14 which surround the lower ends of said tie-rods 5 and extend between the base plate 3 and the first grid 7 of the bundle. Preferably, said tubular spacer members 14 are equal in number to the tie-rods. Thus the supports provided by the twenty-four tubular spacer members ensure perfect load distribution over the surface of said base plate.

As an advantageous feature, each support grid 7 which maintains and supports the bundle of fuel pins 2 by means of the bearing members 11 and 13 is provided with a guide sleeve 15 which is welded to the grid at the level of passage of each tie-rod 5 through this latter so that said tie-rod accordingly passes freely through the sleeve with a suitable clearance. Furthermore, bracing of two successive grids in the bundle is achieved by means of different sleeves or tubes 16 which are mounted between said grids and surround at least a certain number of tie-rods 5 such as, for example, the four tie-rods which are disposed at the corners of the fuel-pin bundle. It should be noted that no provision is made for any sleeve in that region of the tie-rods which is located between the top support grid 7 of the bundle and the top plate 4 in order to permit of free upward expansion of the fuel-pin bundle.

There is thus provided a support structure which makes it possible to accommodate all deformations under irradiation both of support grids, tie-rods and fuel pins, the bundle of pins being uniformly supported over the bottom plate of the structure by means of the spacer tubes which surround the base of each tie-rod. Under these conditions, upward expansion as well as downward expansion of the pins can take place freely without resulting in wear of the tie-rods. Thus the geometry of the fuel-pin bundle is maintained by the tie-rods without any attendant deformation and in conjunction with the support grids, this result being achieved at all operating regimes imposed. Play is taken up at the time of assembly whilst the movements of expansion of the fuel pins after initial increase to full reactor power are accompanied by the support grids which move independently to their positions of equilibrium.

What we claim is:

1. A nuclear fuel assembly comprising, a rigid structure formed by a top plate, a spaced, parallel, bottom end plate, and a series of tie rods connecting said plates at uniform intervals,
   a bundle of clad fuel pins disposed in spaced parallel relation to each other and maintained in a uniform lattice by means of an array of grids equipped with elements adapted to support the fuel pins by resiliently pressing against said fuel pins,
   a series of guide sleeves secured to the nodes of the grid lattice and through which said tie rods are slideably disposed, and
   a series of tubular spacer members mounted on at least a portion of said tie rods between said bottom plate and the guide sleeves secured to the lowest of said grids and between adjacent guide sleeves, so as to support said grids and provide a clearance space between said plates and the fuel pins.

2. A nuclear fuel assembly as defined in claim 1 wherein all of said tie rods are equipped with tubular spacer members.

* * * * *